US012492728B2

United States Patent
Huot-Marchand et al.

(10) Patent No.: US 12,492,728 B2
(45) Date of Patent: Dec. 9, 2025

(54) ROLLING-ELEMENT BEARING WITH SEALS AND LEAKAGE TEST CHANNEL

(71) Applicant: AKTIEBOLAGET SKF, Gothenburg (SE)

(72) Inventors: Marie-Joelle Huot-Marchand, Diges (FR); Vincent Bredoire, Pourrain (FR)

(73) Assignee: AKTIEBOLAGET SKF, Gothenburg (SE)

( * ) Notice: Subject to any disclaimer, the term of this patent is extended or adjusted under 35 U.S.C. 154(b) by 102 days.

(21) Appl. No.: 18/530,379

(22) Filed: Dec. 6, 2023

(65) Prior Publication Data
US 2024/0200604 A1     Jun. 20, 2024

(30) Foreign Application Priority Data
Dec. 20, 2022    (DE) .................. 102022214027.3

(51) Int. Cl.
*F16C 33/78*     (2006.01)
*F16C 19/08*     (2006.01)

(52) U.S. Cl.
CPC .......... *F16C 33/7896* (2013.01); *F16C 19/08* (2013.01); *F16C 33/782* (2013.01)

(58) Field of Classification Search
CPC ................... F16C 33/7896; F16C 33/7879; F16C 33/782; F16C 33/72; F16C 33/7876; F16C 33/7859; F16C 33/7886; F16C 19/08
See application file for complete search history.

(56) References Cited

U.S. PATENT DOCUMENTS 4,395,140 A     7/1983   Sable
10,731,707 B2 *   8/2020   Baumann ............ F16C 33/7823
(Continued)

FOREIGN PATENT DOCUMENTS

DE         3742079 A1    6/1989
DE    102009021322 A1   12/2010
(Continued)

OTHER PUBLICATIONS

Extended European Search Report from the European Patent Office dated Apr. 30, 2024 in related EP application No. 23 216 745.2 including Search Opinion and Search Report.
Unpublished U.S. Appl. No. 18/530,351, Marie-Joelle Huot-Marchand, filing date: Dec. 6, 2023.
Unpublished U.S. Appl. No. 18/530,365, Matthias Hofmann, filing date: Dec. 6, 2023.
Unpublished U.S. Appl. No. 18/530,412, Marie-Joelle Huot-Marchand, filing date: Dec. 6, 2023.

*Primary Examiner* — James Pilkington
*Assistant Examiner* — Aimee Tran Nguyen
(74) *Attorney, Agent, or Firm* — J-TEK LAW PLLC; Scott T. Wakeman; Mark A. Ussai

(57) ABSTRACT

A rolling-element bearing includes first and second concentric ring assemblies mounted for relative rotation. The first ring assembly includes a first rolling ring and a first sealing ring supporting first and second seal elements each having a lip. The second ring assembly includes a second rolling ring and a second sealing ring contacted by the lips of the first and second seal elements. The first sealing ring includes a first sealing member radially spaced from the first seal element and a first leakage test channel having an inlet between the first sealing member and the first seal element and an outlet at an external surface of the first sealing ring, and/or the second sealing ring includes second and third sealing members and a second leakage test channel having an inlet between the second and third sealing members and an outlet at an external surface of the second sealing ring.

9 Claims, 9 Drawing Sheets

(56) References Cited

U.S. PATENT DOCUMENTS

| | | | |
|---|---|---|---|
| 11,022,176 | B2 | 6/2021 | Delaby et al. |
| 11,371,613 | B2 | 6/2022 | Mandou et al. |
| 11,486,444 | B2 | 11/2022 | Capoldi et al. |
| 2013/0039611 | A1 | 2/2013 | Russ et al. |
| 2014/0191508 | A1* | 7/2014 | Schroppel ............... F16C 33/72 |
| | | | 174/21 JC |
| 2014/0346738 | A1 | 11/2014 | Rusch et al. |
| 2019/0011050 | A1 | 1/2019 | Vincent et al. |
| 2019/0323554 | A1* | 10/2019 | Delaby ................... F16C 19/18 |
| 2019/0323559 | A1 | 10/2019 | Delaby et al. |
| 2022/0341543 | A1 | 10/2022 | Kreutzkaemper et al. |
| 2024/0200607 | A1* | 6/2024 | Huot-Marchand ..... F16C 19/18 |

FOREIGN PATENT DOCUMENTS

| | | | |
|---|---|---|---|
| DE | 102011016185 | B4 | 10/2012 |
| EP | 2694831 | A2 | 2/2014 |
| EP | 2806190 | B1 | 3/2017 |
| EP | 2694831 | B1 | 6/2019 |
| GB | 2213539 | A | 8/1989 |
| GB | 2573194 | A | 10/2019 |
| WO | 2010040027 | A2 | 4/2010 |

\* cited by examiner

ROLLING-ELEMENT BEARING WITH SEALS AND LEAKAGE TEST CHANNEL

CROSS-REFERENCE

This application claims priority to German patent application no. 10 2022 214 027.3 filed on Dec. 20, 2022, the contents of which are fully incorporated herein by reference.

TECHNOLOGICAL FIELD

The present disclosure relates to the field of rolling-element bearings, and, in particular, to the field of large-diameter rolling-element bearings having an inner ring and an outer ring arranged concentrically about an axis of rotation running in an axial direction and having a leakage test channel.

BACKGROUND

Such large-diameter rolling-element bearings may be used for example in marine applications, for example in a tidal or marine turbine power station or in a tunnel boring machine or in a mining extraction machine or in a wind turbine.

A large-diameter rolling-element bearing generally comprises two concentric inner and outer rings and at least one row of rolling elements, such as rollers or balls, arranged between the rings. The bearing also comprises seals disposed between the inner and outer rings to define a closed space inside which the rolling elements are arranged.

Large-diameter rolling-element bearings are generally used in aggressive environments, in particular in marine applications. Seals prevent exterior elements, such as dust, abrasive particles, water and marine species, for example plankton and algae, from getting inside the bearing and damaging its components. Those exterior elements may also alter the seal itself, leading to a reduction in the seal service life.

Generally, a plurality of additional adjacent seals is provided on the bearing front side which is directly in contact with the aggressive environments, for example with the saltwater. These additional seals are fixed to a sealing ring of one of the inner and outer rings and comprise a sealing lip in sliding contact with a running surface of a sealing ring of the other ring.

If water starts to enter inside the rolling-element bearing, by first entering between the sealing ring of the inner or outer ring and the associated rolling ring of the ring having the raceway, it is desired to prevent the water or pollution from moving further inside the bearing and reaching the rolling space.

This water ingress problem can occur in most of the applications, but in particular for immersed applications such as in a tidal turbine.

SUMMARY

One aspect of the present disclosure is to overcome this drawback.

The disclosure relates to a rolling-element bearing comprising a first ring assembly and a second ring assembly configured to rotate concentrically relative to one another, and at least one row of rolling elements arranged between first and second raceways of the first and second ring assemblies.

The first ring assembly comprises at least one first rolling ring having the first raceway and at least one first sealing ring secured to the first rolling ring. The second ring assembly comprises at least one second rolling ring having the second raceway and at least one second sealing ring secured to the second rolling ring.

The rolling-element bearing further comprises a friction seal supported by the first sealing ring of the first ring assembly and having at least one sealing lip coming into contact with the second sealing ring of the second ring assembly.

The rolling-element bearing also comprises at least two sealing members arranged successively in the radial direction and located axially between the rolling ring and the associated sealing ring of the first or second ring assembly.

According to a general feature, at least one leakage test channel is provided through the first or second ring assemblies and comprises at least one inlet orifice opening on a surface of the first or second ring assembly in a zone located radially between the sealing members and at least one outlet orifice opening on an external surface of the first or second ring assembly which is accessible from the outside of the rolling-element bearing.

Thanks to the disclosure, in the event that fluid such water enters axially between the rolling ring and the sealing ring of the first or second ring assembly and radially between the sealing members, it is evacuated through the leakage test channel to the outlet orifice(s). This leads to improved sealing performance of the sealing members and avoids the need to change these sealing members too often.

The fluid can circulate through the leakage test channel thanks to the gravity force and/or under the effect of a pump connected to the outlet orifice(s).

In one embodiment, the leakage test channel is provided through the rolling ring or associated sealing ring of the first or second ring assembly, and the inlet orifice opens on a frontal surface of the rolling ring or associated sealing ring.

In one embodiment, the rolling-element bearing further comprises at least one closing element removably attached at the outlet orifice of the first leakage test channel.

Preferably, the closing element is made of transparent material so that one can visually detect the presence of contaminant fluid during an inspection of the bearing. In such case, the closing element can be removed and placed back in position after the fluid has been purged.

The closing element may be a plug. Alternatively, the closing element may be a collector to collect fluid.

In one embodiment, the rolling-element bearing comprises at least two first sealing members arranged successively in the radial direction and axially interposed between the rolling ring and the sealing ring of the second ring assembly, and at least a first leakage test channel provided through the rolling ring of the second ring assembly, the inlet orifice opening on a frontal surface of the rolling ring of the second ring assembly in a zone located radially between the two first sealing members.

In one embodiment, the rolling-element bearing comprises at least second two sealing members arranged successively in the radial direction and axially located between the rolling ring and the sealing ring of the first ring assembly, and at least a second leakage test channel provided through the sealing ring of the first ring assembly, the inlet orifice opening on a frontal surface of the sealing ring of the first ring assembly in a zone located radially between the two second sealing members.

In one embodiment, the first sealing ring of the first ring assembly is formed as a split ring and comprises at least a first part ring (ring section) and a second part ring (ring section) axially stacked, at least one of the second sealing members being axially interposed between the first rolling ring and the first part ring of the first sealing ring of the first ring assembly. The second leakage test channel may extend axially through the first and second part rings of the first sealing ring.

Preferably, the rolling-element bearing comprises at least two friction seals each having at least one sealing lip coming into contact with the second sealing ring of the second ring assembly, the two friction seals being arranged successively in the axial direction and respectively supported by the first and second part rings of the first ring assembly. One of the at least two friction seals may form one of the at least two second sealing members.

In one embodiment, the first sealing ring of the first ring assembly may further comprise at least a third part ring axially stacked with the first and second part rings and supporting a third friction seal having at least one sealing lip coming into contact with the second sealing ring of the second ring assembly. In this case, the second leakage test channel extends axially through the first, second and third part rings of the first sealing ring.

In one embodiment, the rolling-element bearing further comprises, axially on each side of the first and second rolling rings of the first and second ring assemblies, seals delimiting radially between the first and second rolling rings a closed rolling space inside which is housed the row of rolling elements, the seals being distinct from the friction seal(s).

In one embodiment, the first ring assembly is the inner ring and the second ring assembly is the outer ring. Alternatively, the first ring assembly is the outer ring and the second ring assembly is the inner ring.

BRIEF DESCRIPTION OF THE DRAWINGS

The present disclosure and its advantages will be better understood by studying the detailed description of a specific embodiments given by way of non-limiting examples and illustrated by the appended drawings on which.

DETAILED DESCRIPTION

Figure 1:
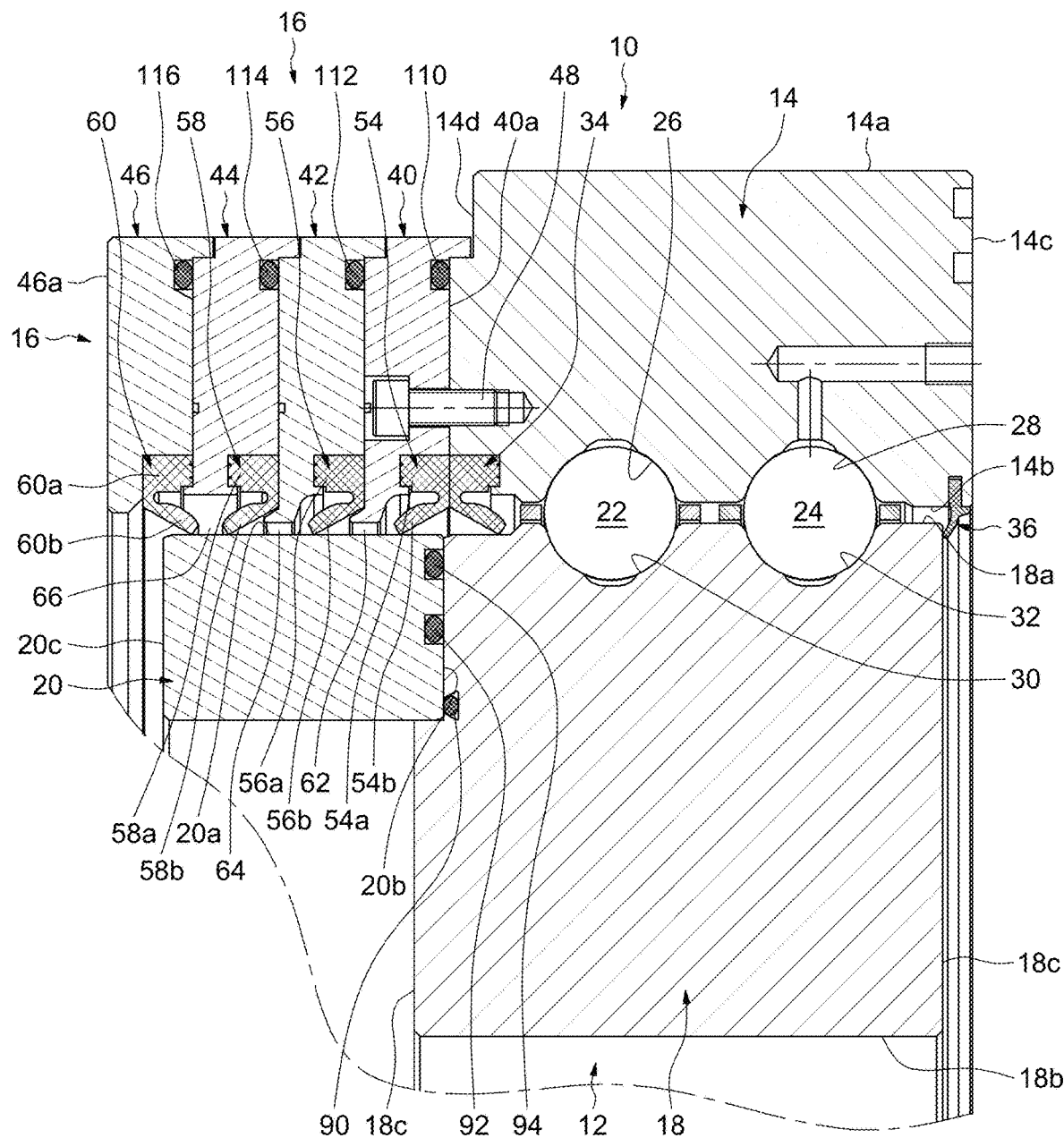
FIG. 1 is a cross-section of a rolling-element bearing according to a first example of the disclosure.

The rolling-element bearing illustrated in FIG. 1 is a large-diameter rolling-element bearing comprising a first ring assembly 10 and a second ring assembly 12. In the illustrated example, the first ring assembly 10 is the outer ring and the second ring assembly 12 is the inner ring. The rolling-element bearing may be used in a tidal or marine turbine power station, a tunnel boring machine, a wind turbine, a big offshore crane or any other applications wherein a large diameter rolling-element bearing is required.

The outer and inner rings 10, 12 are concentric and extend axially along the bearing rotation axis (not shown) which runs in an axial direction. In this illustrated example, the rings 10, 12 are of the solid type.

The outer ring 10 comprises a rolling ring 14 and a sealing ring 16 secured to the rolling ring 14. The inner ring 12 also comprises a rolling ring 18 and a sealing ring 20 secured to the rolling ring 18. The sealing ring 16 of the outer ring radially surrounds the sealing ring 20 of the inner ring.

As will be described later, a plurality of successive seals are radially provided between the sealing rings 16, 20.

In the illustrated example, the rolling-element bearing also comprises two rows of balls 22, 24 which are arranged between first raceways 26, 28 of the rolling ring 14 of the outer ring and second raceways 30, 32 of the rolling ring 18 of the inner ring.

The rolling ring 18 of the inner ring comprises an outer cylindrical surface 18a from which the raceways 30, 32 are formed. The raceways 30, 32 are oriented radially outwards. The rolling ring 18 also comprises an inner cylindrical surface or bore 18b which is radially opposite the outer surface 18a. The rolling ring 18 further comprises two opposite first and second frontal surfaces 18c, 18d which axially delimit the outer surface 18a and the bore 18b. The frontal surfaces 18c, 18d delimit the axial thickness of the rolling ring 18.

The rolling ring 14 of the outer ring comprises an outer cylindrical surface 14a and an inner cylindrical bore 14b which is radially opposite the outer surface 14a and from which the raceways 26, 28 are formed. The raceways 26, 28 are oriented radially inwards. The rolling ring 14 further comprises two opposite first and second frontal surfaces 14c, 14d which axially delimit the outer surface 14a and the bore 14b. The frontal surfaces 14c, 14d delimit the axial thickness of the rolling ring 14.

The rolling-element bearing further comprises, axially on each side of the rolling rings 14 and 18, an annular seal (seal element) 34, 36 mounted on the rolling ring 14 and provided to close the radial space that exists between the rolling rings 14, 18. This radial space is defined between the bore 14b of the rolling ring 14 and the outer surface 18a of the rolling ring 18. An annular closed rolling space (not referenced) is defined between the rolling rings 14, 18 and the seals 34, 36 in which the rows of balls 22, 24 are housed. Advantageously, the rolling space is filled with lubricant.

Each seal 34, 36 is mounted in a groove (not referenced) formed on the cylindrical bore 14b of the rolling ring 14 and comes into contact with the rolling ring 18. The seal 34 comes into contact with the outer surface 18a of the rolling ring 18. The seal 36 comes into contact with the frontal surface 18c of the rolling ring 18. Alternatively, it could be possible to provide a reversed arrangement for at least one of the seals 34, 36 with the seal mounted on the rolling ring 18 and coming into friction contact with the rolling ring 14.

The sealing ring 16 of the outer ring is mounted axially in contact against the frontal surface 14d of the rolling ring 14. The sealing ring 16 protrudes axially with regard to the rolling ring 14. The sealing ring 16 is removably attached or secured to the rolling ring 14. The sealing ring 16 radially surrounds the sealing ring 20 of the inner ring. Each of the sealing rings 16, 20 may be made of stainless steel or treated steel with a painting or anti-corrosion treatment.

In the illustrated example, the sealing ring 16 is formed as a split (multi-part) ring and comprises first, second, third and fourth part rings 40, 42, 44, 46 (ring sections) stacked one relative to the other in the axial direction. Alternatively, the sealing ring 16 may be made in one part.

The first part ring 40 is removably secured to the rolling ring 14 by screws 48 spaced apart in the circumferential direction. The first part ring 40 axially abuts against the frontal surface 14d of the rolling ring 14. Similarly, the second part ring 42 is removably secured to the first part ring 40 by screws (not shown) axially on the side opposite the rolling ring 14. The third part ring 44 is removably secured to the second part ring 42 by screws 50 (FIGS. 2 and 5) on the side axially opposite the first part ring 40. The fourth part ring 46 is removably secured to the third part ring 44 by screws 52 (FIG. 6) on the side axially opposite the second part ring 42. The heads of the screws of the first part ring 40 may be covered by potting material and embedded inside this material. Hence, the associated threads of the screws are sealed.

As previously mentioned, a plurality of successive annular seals are provided radially between the sealing ring 16 of the outer ring and the sealing ring 20 of the inner ring.

In the illustrated example, the rolling-element bearing is having first, second, third and fourth successive seals 54, 56, 58 60 supported by the sealing ring 16 of the outer ring. The sealing ring 16 bears the seals 54, 56, 58, 60. The seals 54, 56, 58, 60 are arranged successively in the axial direction.

The first, second, third and fourth successive seals 54, 56, 58, 60 are respectively mounted on the first, second, third and fourth part rings 40, 42, 44, 46 of the sealing ring. Hence, the first seal 54 axially contacts the side of the rolling ring 14, the fourth seal 60 axially contacts the exterior side of the rolling-element bearing, and the second and third seals 56, 58 are axially disposed between these two seals. The second seal 56 is locally axially inward relative to the third and fourth seals 58, 60. The first seal 54 is locally axially inward with respect to the second seal 56.

Each seal 54, 56, 58, 60 includes an annular heel 54a, 56a, 58a, 60a and an annular friction lip 54b, 56b, 58b, 60b projecting from the heel. In the illustrated example, each friction lip 54b, 56b, 58b, 60b extends inwardly from the respective heel 54a, 56a, 58a, 60a. Here, each friction lip 54b, 56b, 58b, 60b extends obliquely. In the illustrated example, the lips 54b, 56b, 58b extend obliquely outwards while the lip 60b extends obliquely inwards.

The heel 54a, 56a, 58a, 60a of each seal is mounted in axial and radial contact against the associated first, second, third and fourth part ring 40, 42, 44, 46 of the sealing ring. Here, the heel 54a of the first seal also abuts axially against the seal 34.

Each lip 54b, 56b, 58b, 60b comes into frictional contact with the sealing ring 20 of the inner ring. The lips 54b, 56b, 58b, 60b come into frictional contact with the outer surface of the sealing ring 20. The contact between each lip 54b, 56b, 58b, 60b and the sealing ring 20 is radial. The lips 54b, 56b, 58b, 60b are flexible in the radial direction. Preferably, the free end of each lip has a triangular shape in cross-section in order to reduce friction.

In the illustrated example, the seals 54, 56, 58, 60 are identical to each other.

Alternatively, the seals 54, 56, 58, 60 may be different from one another. In the illustrated example, the rolling-element bearing comprises four seals 54, 56, 58, 60. The number of seals may be different. For example, the rolling-element bearing may comprise at least two seals. The seals 54, 56, 58, 60 may be made of elastomeric material, for example polyurethane.

The sealing lips 54b, 56b of the first and second seals 54, 56 delimit b a first chamber 62 between the sealing ring 16 of the outer ring and the sealing ring 20 of the inner ring.

Similarly, the sealing lips 56b, 58b of the second and third seals 56, 58 delimit a second chamber 64 between the sealing rings 16, 20. The second chamber 64 is offset axially outward with respect to the first chamber 62. The sealing lips 58b, 60b of the third and fourth seals 58, 60 delimit a third chamber 66 between the sealing rings 16, 20. The third chamber 66 is offset axially outward with respect to the second chamber 64. The chamber 64 is located axially between the first and second chambers 62, 66. The first, second and third chambers 62, 64, 66 are axially successive.

Figure 6:
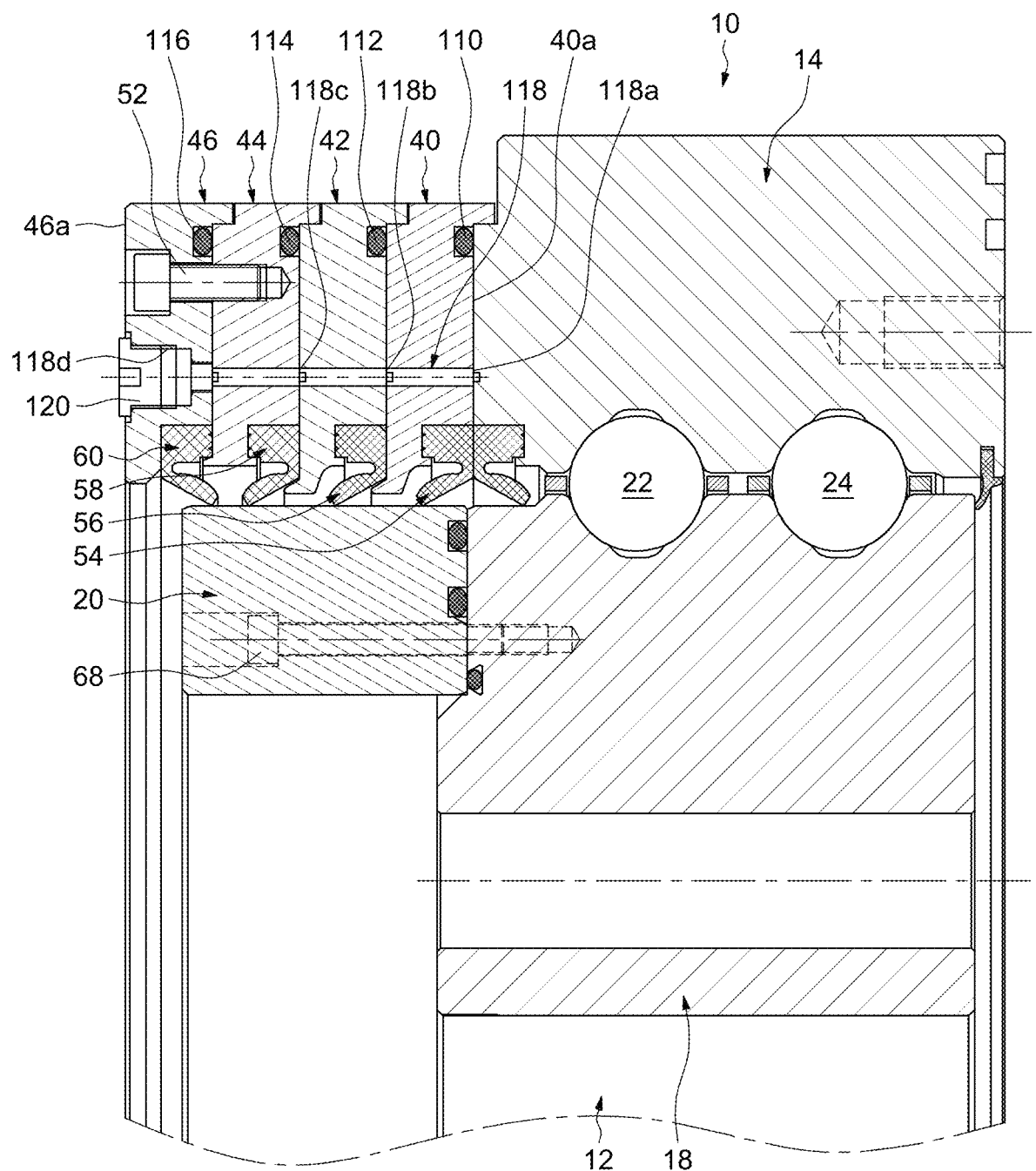

The sealing ring 20 of the inner ring is removably attached or secured to the rolling ring 18 by screws 68 (FIG. 6). The heads of the screws 68 may be covered by potting material and embedded inside this material. Hence, the associated threads of the screws 68 are sealed. The sealing ring 20 is mounted axially in contact against the frontal surface 18c of the rolling ring 18. The sealing ring 20 protrudes axially with regard to the rolling ring 18.

The sealing ring 20 comprises an outer cylindrical surface 20a and an inner cylindrical surface or bore (not referenced) which is radially opposite the outer surface 20, and two opposite first and second frontal surfaces 20b, 20c which axially delimit the outer surface 20a and the bore. The frontal surfaces 20b, 20c delimit the axial thickness of the sealing ring 20. The frontal surface 20b of the sealing ring is mounted in axially contact with the frontal surface 18c of the rolling ring 18. The friction lips 54b, 56b, 58b, 60b of the first, second, third and fourth successive seals 54, 56, 58, 60 come into friction contact with the outer surface 20a of the sealing ring.

Figure 2:
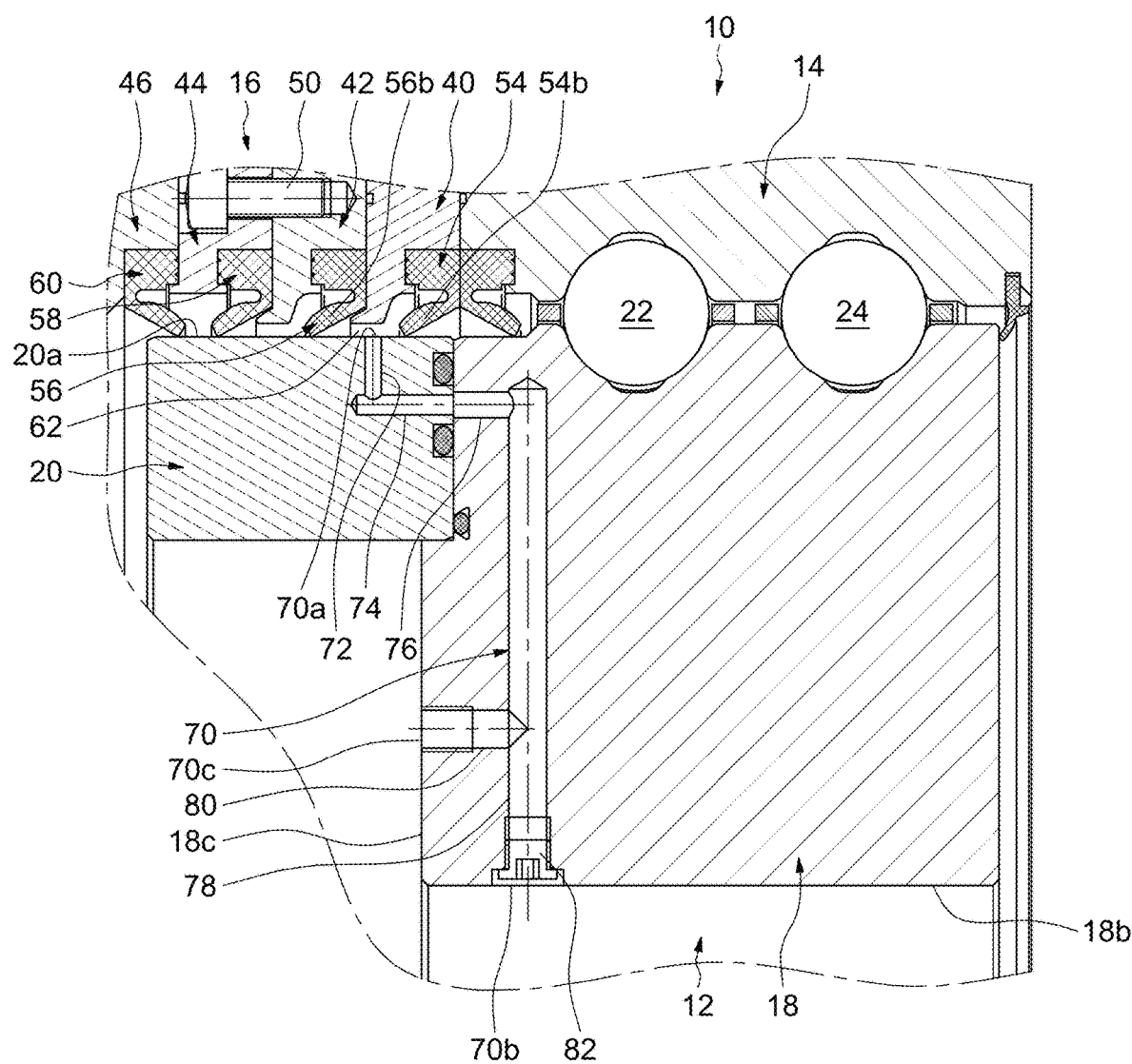
FIGS. 2 to 4 are partial cross-sections of the rolling-element bearing of FIG. 1 according to other cutting planes.

As shown on FIG. 2, in the illustrated example, the rolling-element bearing comprises a first purging channel 70 that extends through the inner ring 12 and is in fluidic communication with the first chamber 62 delimited by the sealing lips 54b, 56b of the first and second seals 54, 56. During operation, the purging channel 70 enables any fluid that leaks into the sealed chamber 62 to be evacuated. Prior to operation, the purging channel 70 may be used to introduce lubricant, preferably grease, into the chamber 62. Such lubricant forms an additional barrier against the ingress of contaminants.

In the illustrated example, the purging channel 70 is provided in the sealing ring 20 and the rolling ring 18 of the inner ring. The purging channel 70 has an inlet orifice 70a opening into the first chamber 62. The inlet orifice 70a opens on the outer surface of the sealing ring 20 axially between the sealing lips 54b, 56b of the first and second seals 54, 56.

The purging channel 70 also has a first outlet orifice 70b at the opposite end of the purging channel 70 from the inlet orifice 70a and opening on the bore 18b of the rolling ring 18 which is accessible from outside the rolling-element bearing. In the illustrated example, the purging channel 70 further includes a second outlet orifice 70c opening on the frontal surface 18c of the rolling ring 18 which is accessible from the outside of the rolling-element bearing. Alternatively, the purging channel 70 may have only the outlet orifice 70b or 70c.

The purging channel 70 is formed from several holes or bores in the thickness of the sealing ring 20 and the rolling ring 18. The purging channel 70 comprises a radial first hole 72 extending from the inlet orifice 70a and a axial second hole 74 connected to the first radial hole 72, the holes being both formed in the sealing ring 20. Alternatively, the purging channel 70 may comprise several radial holes 72 each extending from an inlet orifice 70a opening into the first chamber 62 and each connected to the axial second hole 74. In this case, the radial holes 72 are spaced apart in the circumferential direction.

The purging channel 70 also comprises a axial third hole 76, a radial fourth hole 78 and an axial fifth hole 80 both formed in the rolling ring 18. The axial third hole 76 axially faces the axial second hole 74, the radial fourth hole 78 is connected to the axial third hole 76 and extends from the outlet orifice 70b, and the axial fifth hole 80 is connected to the radial fourth hole 78 and connected to the outlet orifice 70c.

The rolling-element bearing also comprises a first closing plug 82 attached at the outlet orifice 70b of the purging channel 70. The closing plug 82 may be attached to the outlet orifice 70b by any appropriate means, for example by screwing. Preferably, the closing plug 82 is made of transparent material in order to be able to allow the visual detection of contaminant fluid during an inspection of the rolling-element bearing. In the illustrated example, the closing plug 82 does not protrude radially with respect to the bore 18b of the rolling ring. The closing plug 82 may be covered by potting material and embedded inside this material. Hence, the associated thread of the closing plug 82 is sealed.

As previously mentioned, in the illustrated example, the purging channel 70 also includes the second outlet orifice 70c. The rolling-element bearing may be having a plug or with a sensor (not illustrated) mounted at the outlet orifice 70c to detect water.

Figure 3:
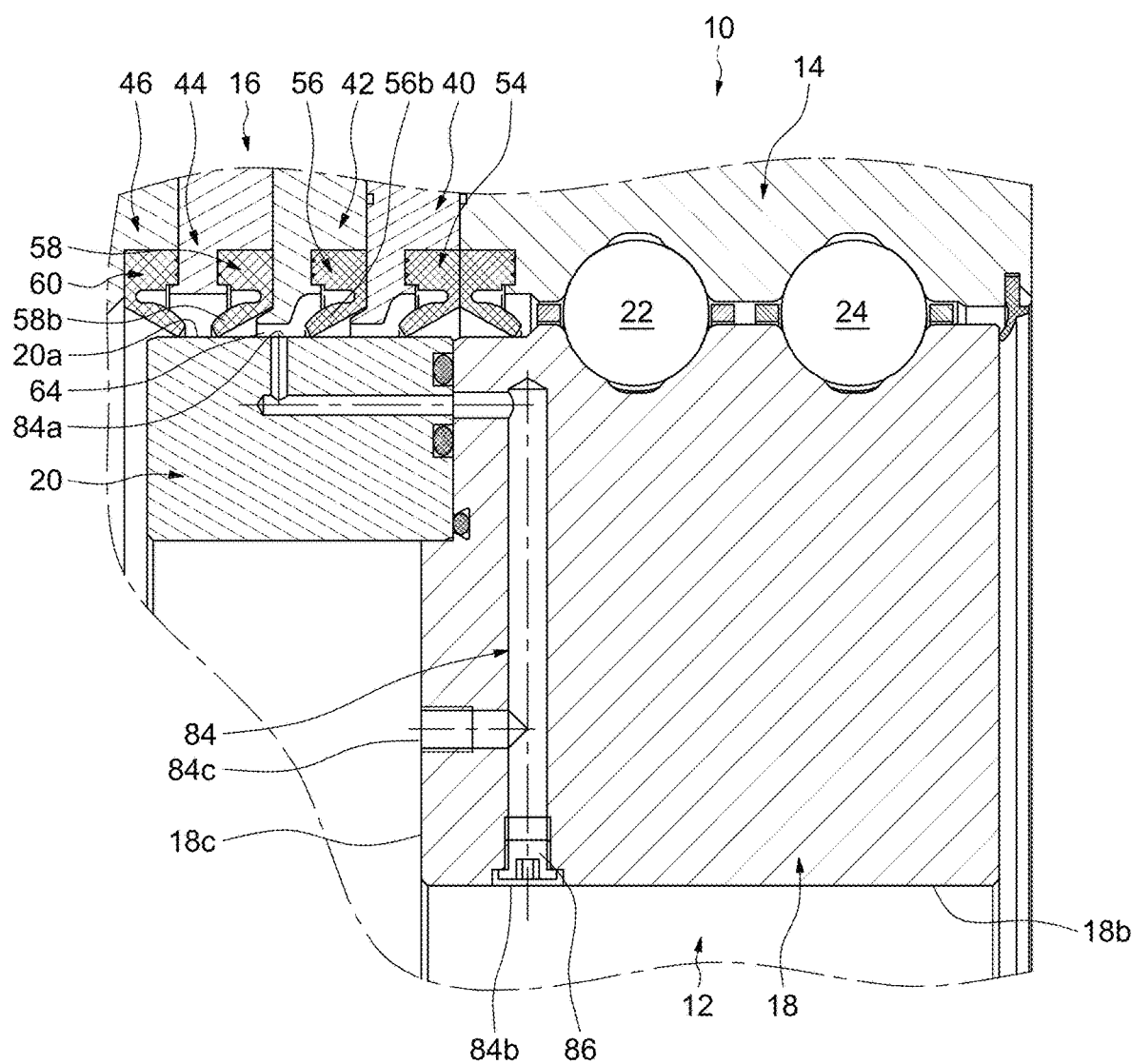

As shown on FIG. 3, in the illustrated example, the rolling-element bearing comprises a second purging channel 84 in the inner ring 12 and in fluidic communication with the second chamber 64 delimited by the sealing lips 56b, 58b of the second and third seals 56, 58. In operation, the purging channel 84 enables any fluid that leaks into the sealed chamber 64 to be evacuated. Prior to operation, the purging channel 84 may be used to introduce lubricant, preferably grease, into the chamber 64. Such lubricant forms an additional barrier against the ingress of contaminants.

In the illustrated example, the purging channel 84 extends through the sealing ring 20 and the rolling ring 18 of the inner ring. The purging channel 84 has an inlet orifice 84a opening into the second chamber 64. The inlet orifice 84a opens on the outer surface of the sealing ring 20 axially between the sealing lips 56b, 58b of the second and third seals 56, 58.

The purging channel 84 has a first outlet orifice 84b at the end of the channel opposite the inlet orifice 84a and opening on the bore 18b of the rolling ring 18. In the illustrated example, the purging channel 84 is also has a second outlet orifice 84c opening on the frontal surface 18c of the rolling ring 18. Alternatively, the purging channel 84 may have only the outlet orifice 84b or the outlet orifice 84c.

Similarly to the purging channel 70, the purging channel 84 is made of several holes or bores in the sealing ring 20 and the rolling ring 18. The purging channel 84 is circumferentially offset from the purging channel 70.

The rolling-element bearing also comprises a second closing plug 86 attached at the outlet orifice 84b of the purging channel. The closing plug 86 may be attached to the outlet orifice 84b by any appropriate means, for example by screwing. Preferably, the closing plug 86 is made of transparent material in order to be able to visually detect the presence of contaminant fluid during an inspection of the rolling-element bearing. In the illustrated example, the closing plug 86 does not radially protrude with respect to the bore 18b of the rolling ring. The closing plug 86 may be covered by potting material and embedded inside this material. Hence, the associated thread of the closing plug 86 is sealed.

As previously mentioned, in the illustrated example, the purging channel 84 also has the second outlet orifice 84c. The rolling-element bearing may be having a plug or with a sensor (not illustrated) mounted at the outlet orifice 84c to detect water.

Figure 4:
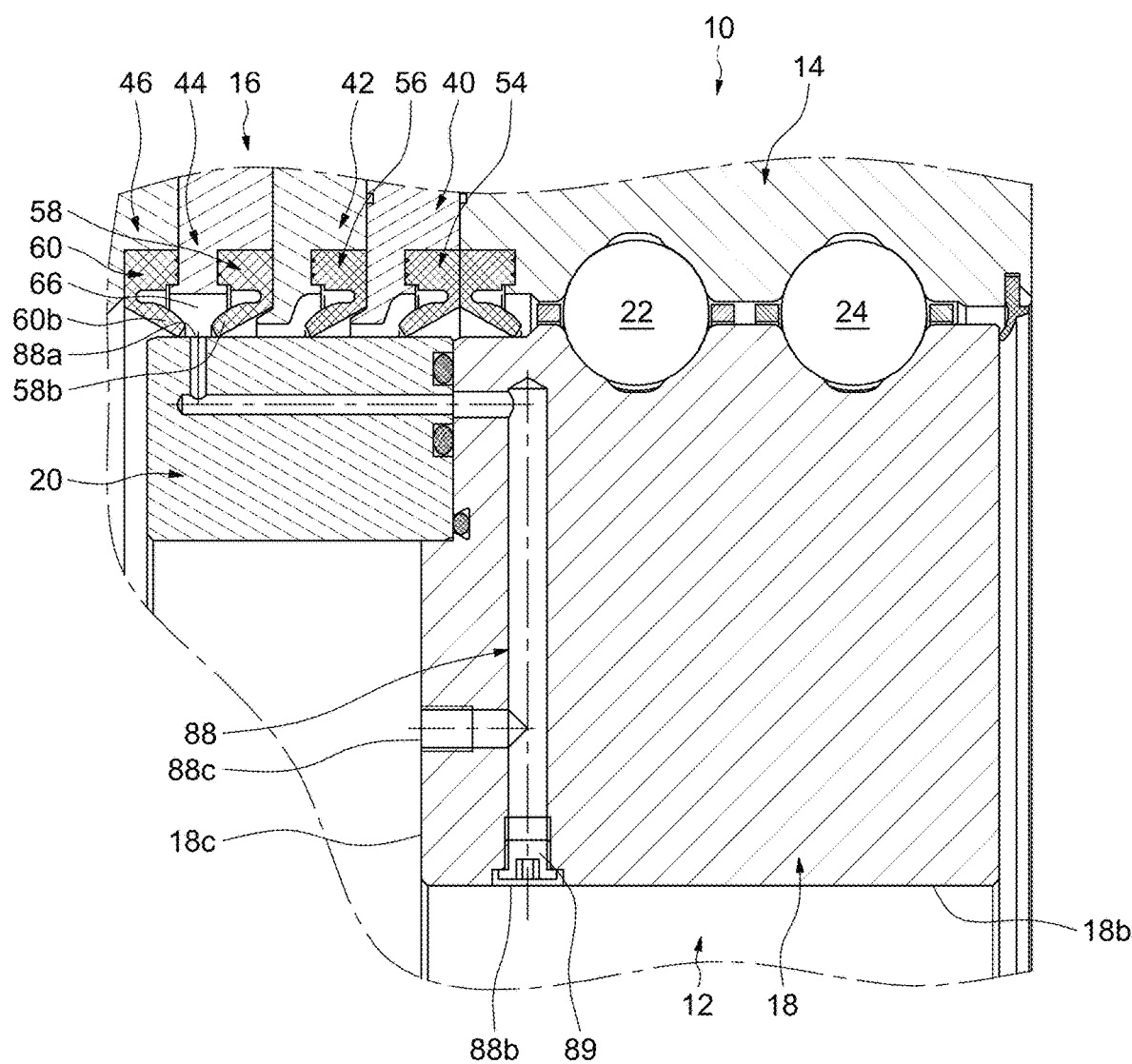

As shown on FIG. 4, in the illustrated example, the rolling-element bearing comprises a third purging channel 88 in the inner ring 12 and in fluidic communication with the third chamber 66 delimited by the sealing lips 58b, 60b of the third and fourth seals 58, 60. In operation, the purging channel 88 enables any fluid which leaks into the sealed chamber 66 to be evacuated. Prior to operation, the purging channel 88 may be used to introduce lubricant, preferably grease, into the chamber 66. Such lubricant forms an additional barrier against the ingress of contaminants. In a preferred embodiment, lubricant is provided only inside the first and second chambers 62, 64. In such case, the aim of the third purging channel 88 is only to evacuate any fluid which enters inside the third chamber 66.

In the illustrated example, the purging channel 88 extends through the sealing ring 20 and the rolling ring 18 of the inner ring. The purging channel 88 has an inlet orifice 88a opening into the third chamber 66. The inlet orifice 88a opens on the outer surface of the sealing ring 20 axially between the sealing lips 58b, 60b of the third and fourth seals.

The purging channel 88 also has a first outlet orifice 88b at an end of the purging channel 88 opposite the inlet orifice 88a and opening on the bore 18b of the rolling ring 18. In the illustrated example, the purging channel 88 is further includes a second outlet orifice 88c opening on the frontal surface 18c of the rolling ring 18. Alternatively, the purging channel 84 may be provided only with the outlet orifice 88b or the outlet orifice 88c.

Similarly to the purging channels 70 and 84, the purging channel 88 is made of several holes or bores in the sealing ring 20 and the rolling ring 18. The purging channel 88 is circumferentially offset from the purging channels 70, 84.

In the illustrated example, the purging channels 70, 84 and 88 are distinct from each other. Alternatively, some holes may be shared by at least two of these purging channels, namely the axial hole 76 and radial hole 78.

In the illustrated example, each of the purging channels 70, 84 and 88 is provided through the sealing ring 20 and the rolling ring 18 of the inner ring. Alternatively, at least one these purging channels 70, 84 and 88 may be provided only through the sealing ring 20.

The rolling-element bearing also comprises a third closing plug 89 attached at the outlet orifice 88b of the purging channel. The closing plug 89 may be attached to the outlet orifice 88b by any appropriate means, for example by screwing. Preferably, the closing plug 89 is made of transparent material in order to be able to visually detect the presence of contaminant fluid during an inspection of the rolling-element bearing. In the illustrated example, the closing plug 89 does not radially protrude with respect to the bore 18b of the rolling ring. The closing plug 89 may be recovered by potting material and embedded inside this material. Hence, the associated thread of the closing plug 89 is sealed.

As previously mentioned, in the illustrated example, the purging channel 88 is also having the second outlet orifice 88c. The rolling-element bearing may be having a plug or with a sensor (not illustrated) mounted at the outlet orifice 88c to detect water.

Alternatively, the first leakage test channel and/or the second leakage test channel and/or the third leakage test channel may be omitted from the rolling-element bearing.

Figure 5:
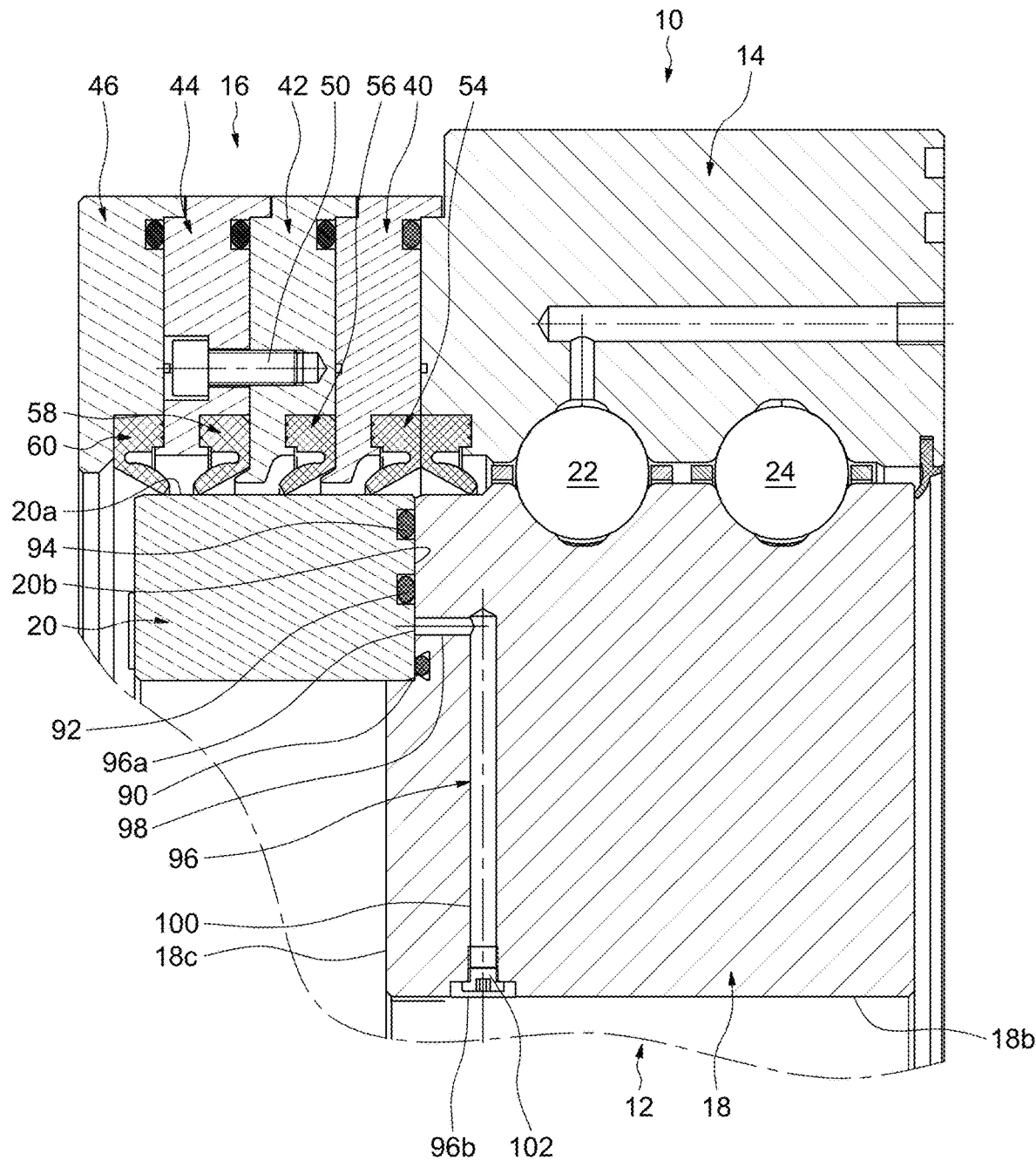
FIGS. 5 to 7 are cross-sections of the rolling-element bearing of FIG. 1 according to other cutting planes.

As shown notably on FIGS. 1 and 5, the rolling-element bearing further includes first, second and third successive annular sealing members 90, 92, 94 axially interposed between the rolling ring 18 and the sealing ring 20 of the inner ring. The sealing members 90, 92, 94 are arranged successively in the radial direction.

The sealing members 90, 92, 94 are axially interposed between the frontal surface 18c of the rolling ring 18 and the frontal surface 20b of sealing ring. Here, the rolling ring 18 supports the first sealing member 90 and the sealing ring 20 supports the second and third sealing members 92, 94. Alternatively, it could be possible to foresee a reversed arrangement of the sealing members 90, 92, 94 on the rolling and sealing rings 18, 20. Grooves (not referenced) are provided on the frontal surfaces 18c, 20b to receive the sealing members 90, 92, 94. In the illustrated example, the sealing members 90, 92, 94 have in cross-section a circular shape. Alternatively, the sealing members 90, 92, 94 may have other shapes.

The sealing member 90 is radially offset inward with respect to the sealing member 92, and the sealing member 92 is radially offset inward with respect to the sealing member 74.

In the illustrated example, the rolling-element bearing comprises three sealing members 90, 92, 94. The number of sealing members may be different. For example, the rolling-element bearing may comprise only the two sealing members 90 and 92. The sealing members 90, 92, 94 may be made of elastomeric material, for example polyurethane.

The rolling-element bearing further comprises a first leakage test channel 96 (e.g., FIG. 5) in the inner ring 12. In the illustrated example, the leakage test channel 96 extends through the rolling ring 18 of the inner ring.

The leakage test channel 96 has an inlet orifice 96a opening on the frontal surface 18c of the rolling ring in a zone located radially between the sealing members 90, 92. The leakage test channel 96 has an outlet orifice 96b opposite the inlet orifice 96a and opening on the bore 18b of the rolling ring which is accessible from the outside of the rolling-element bearing.

Prior to use of the rolling-element bearing, the leakage test channel 96 enables a fluid to be introduced radially between the sealing members 90, 92 at the junction of the frontal surface 18c of the rolling ring and the frontal surface 20b of the sealing ring. Hence, the effectiveness of the sealing members 90, 92 may be tested. The introduced fluid may be compressed air, lubricant, colored liquid, etc.

In use, the leakage test channel 96 enables the fluid any fluid which enter into the zone located radially between the sealing members 90, 92 at the junction of the frontal surface 18c of the rolling ring and the frontal surface 20b of the sealing ring to be evacuated.

The leakage test channel 96 includes several holes or bores in the rolling ring 18. The leakage test channel 96 comprises an axial first hole 98 extending from the inlet orifice 96a and a radial second hole 100 connected to the radial first hole 98 and extending to the outlet orifice 96b, the holes being both formed in the thickness of the rolling ring 18.

The rolling-element bearing also comprises a fourth closing plug 102 attached at the outlet orifice 96b of the leakage test channel. The closing plug 102 may be attached to the outlet orifice 96b by any appropriate means, for example by screwing. Preferably, the closing plug 102 is made of transparent material in order to allow visual detection of the presence of contaminant fluid during an inspection of the rolling-element bearing. In the illustrated example, the closing plug 102 does not protrude radially with respect to the bore 18b of the rolling ring. The closing plug 102 may be covered by potting material and embedded inside this material. Hence, the associated thread of the closing plug 102 is sealed.

Figure 8:
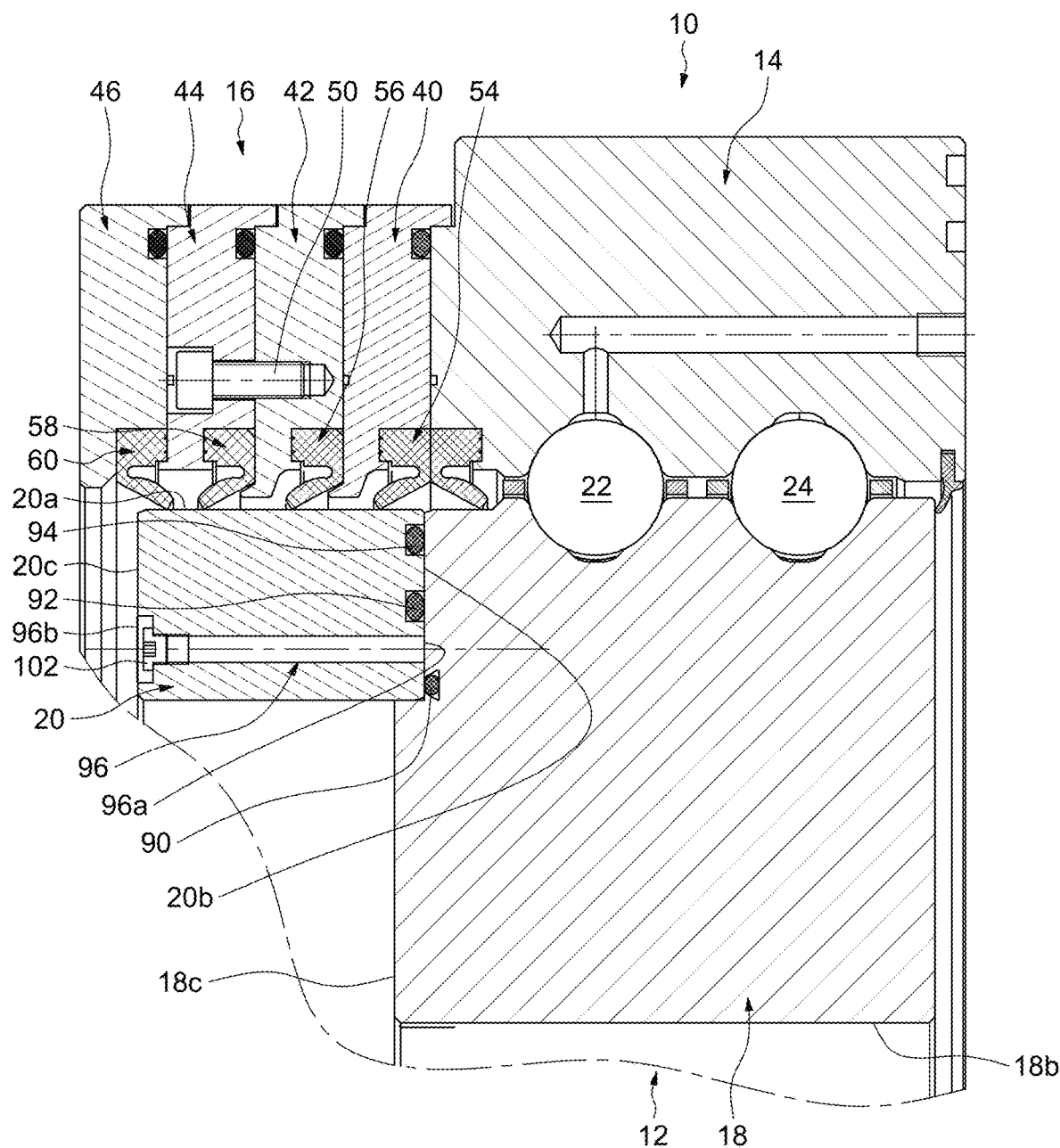
FIG. 8 is a cross-section of a rolling-element bearing according to a second example of the disclosure.

As previously mentioned, in the illustrated example, the leakage test channel 96 is located in the rolling ring 18 of the inner ring. Alternatively, as shown on FIG. 8, the first leakage test channel 96 may be located in the sealing ring 20.

In this alternative embodiment, the inlet orifice 96a of the leakage test channel 96 opens on the frontal surface 20b of the sealing ring and the outlet orifice 96b opens on the opposite frontal surface 20c which is accessible from the outside of the rolling-element bearing. The leakage test channel 96 is here made of one single hole in the sealing ring 20.

Referring once again to FIGS. 1 and 6, in the first illustrated example, the rolling-element bearing further includes a first seal member 110 axially interposed between the first part ring 40 of the sealing ring and the rolling ring 14 of the outer ring. The seal member 110 is axially interposed between the frontal surface 14d of the rolling ring and the frontal surface 40a of the first part ring 40 axially bearing against this frontal surface 14d. A groove (not referenced) is provided on this frontal surface 40a of the first part ring 40. Hence, the first part ring 40 here bears the sealing member 110. Alternatively, the rolling ring 14 may bear the sealing member 110. The seal member 110 is offset radially outwards with respect to the first seal 54. The seal member 110 radially surrounds the first seal 54.

The rolling-element bearing also includes a second seal member 112 axially interposed between the first and second part rings 40, 42 of the sealing ring. The seal member 112 is axially interposed between the frontal surfaces of the first and second part rings 40, 42 in axial contact one against the other. A groove (not referenced) is provided on this frontal surface of the second part ring 42. Hence, the second part ring 42 here bears the sealing member 112. Alternatively, the first part ring 40 may bear the sealing member 112. The seal member 112 is radially offset outwards with respect to the second seal 56. The seal member 112 radially surrounds the second seal 56.

The rolling-element bearing is further having a third seal member 114 axially interposed between the second and third part rings 42, 44 of the sealing ring. The seal member 114 is axially interposed between the frontal surfaces of the second and third part rings 42, 44 in axial contact one against the other. A groove (not referenced) is provided on this frontal surface of the third part ring 44. Hence, the third part ring 44 here supports the sealing member 114. Alternatively, the second part ring 42 may support the sealing member 114. The seal member 114 is offset radially outward with respect to the third seal 58. The seal member 114 radially surrounds the third seal 58.

The rolling-element bearing further includes a fourth seal member 116 axially interposed between the third and fourth part rings 44, 46 of the sealing ring. The seal member 116 is axially interposed between the frontal surfaces of the third and fourth part rings 44, 46 in axial contact one against the other. A groove (not referenced) is provided on this frontal surface of the fourth part ring 46. Hence, the fourth part ring 46 here supports the sealing member 116. Alternatively, the third part ring 44 may support the sealing member 116. The seal member 116 is offset radially outward with respect to the fourth seal 60. The seal member 116 radially surrounds the fourth seal 60. The seal members 110 to 116 are aligned in the axial direction.

The rolling-element bearing includes a second leakage test channel 118 that extends through the sealing ring 16 of the outer ring. The leakage test channel 118 extends through the axial thickness of the sealing ring 16. The leakage test channel 118 extends axially through the first, second, third and fourth parts 40, 42, 44, 46 of the sealing ring 16. Alternatively, the leakage test channel 118 may be provided in the rolling ring 14.

The leakage test channel 118 includes a first inlet orifice 118a opening on the frontal surface 40a of the first part 40 of the sealing ring, which is in axial contact with the rolling ring 14, in a zone located radially between the sealing member 110 and the seal 54.

The leakage test channel 118 also includes a second inlet orifice 118b opening on the frontal surface of the second part 42 of the sealing ring, which is in axial contact with the first part 40, in a zone located radially between the sealing member 112 and the seal 56. The leakage test channel 96 further includes a third inlet orifice 118c opening on the frontal surface of the third part 44 of the sealing ring, which is in axial contact with the second part 42, in a zone located radially between the sealing member 114 and the seal 58.

The leakage test channel 118 also includes an outlet orifice 118d opening on the frontal surface 46a of the fourth part 46 of the sealing ring which is oriented axially outwards and accessible from outside the rolling-element bearing. The frontal surface 46a is located axially on the side opposite the third part 44. The frontal surfaces 40a, 46a delimit the axial thickness of the sealing ring 16. The leakage test channel 118 is made of several axial aligned through-holes provided in the sealing ring 16. The inlet orifices 118a, 118b, 118c and the outlet orifice 118d are aligned in the axial direction.

Prior to use of the rolling-element bearing, the leakage test channel 118 enables a fluid to be introduced radially between the sealing member 110 and the seal 54 at the junction of the rolling ring 14 and the first part 40, and radially between the sealing member 112 and the seal 56 at the junction of the first and second parts 40 and 42, and radially between the sealing member 114 and the seal 58 at the junction of the second and third parts 42 and 44, and radially between the sealing member 116 and the seal 60 at the junction of the third and the fourth parts 44, 46. Hence, the effectiveness of the sealing members 110 to 116 and the seals 54, 56, 58, 60 may be tested. The introduced fluid may be compressed air, lubricant, colored liquid, etc.

In operation, the leakage test channel 118 enables the evacuation of any fluid that leaks into the zone located radially between the sealing member 110 and the seal 54 at the junction of the rolling ring 14 and the first part 40, and into the zone located radially between the sealing member 112 and the seal 56 at the junction of the first and second parts 40 and 42, and in the zone located radially between the sealing member 114 and the seal 58 at the junction of the second and third parts 42 and 44, and in the zone located radially between the sealing member 116 and the seal 60 at the junction of the third and the fourth parts 44, 46.

The rolling-element bearing also comprises a fifth closing plug 120 attached at the outlet orifice 118b of the leakage test channel. The closing plug 120 may be attached to the outlet orifice 118b by any appropriate means, for example by screwing. Preferably, the closing plug 120 is made of transparent material in order to allow the visual detection of the presence of contaminant fluid during an inspection of the rolling-element bearing. In the illustrated example, the closing plug 120 axially protrudes with respect to the frontal surface 46a of the fourth part 46 of the sealing ring. The closing plug 120 may be covered by potting material and embedded inside this material. Hence, the associated thread of the closing plug 120 is sealed.

Figure 7:
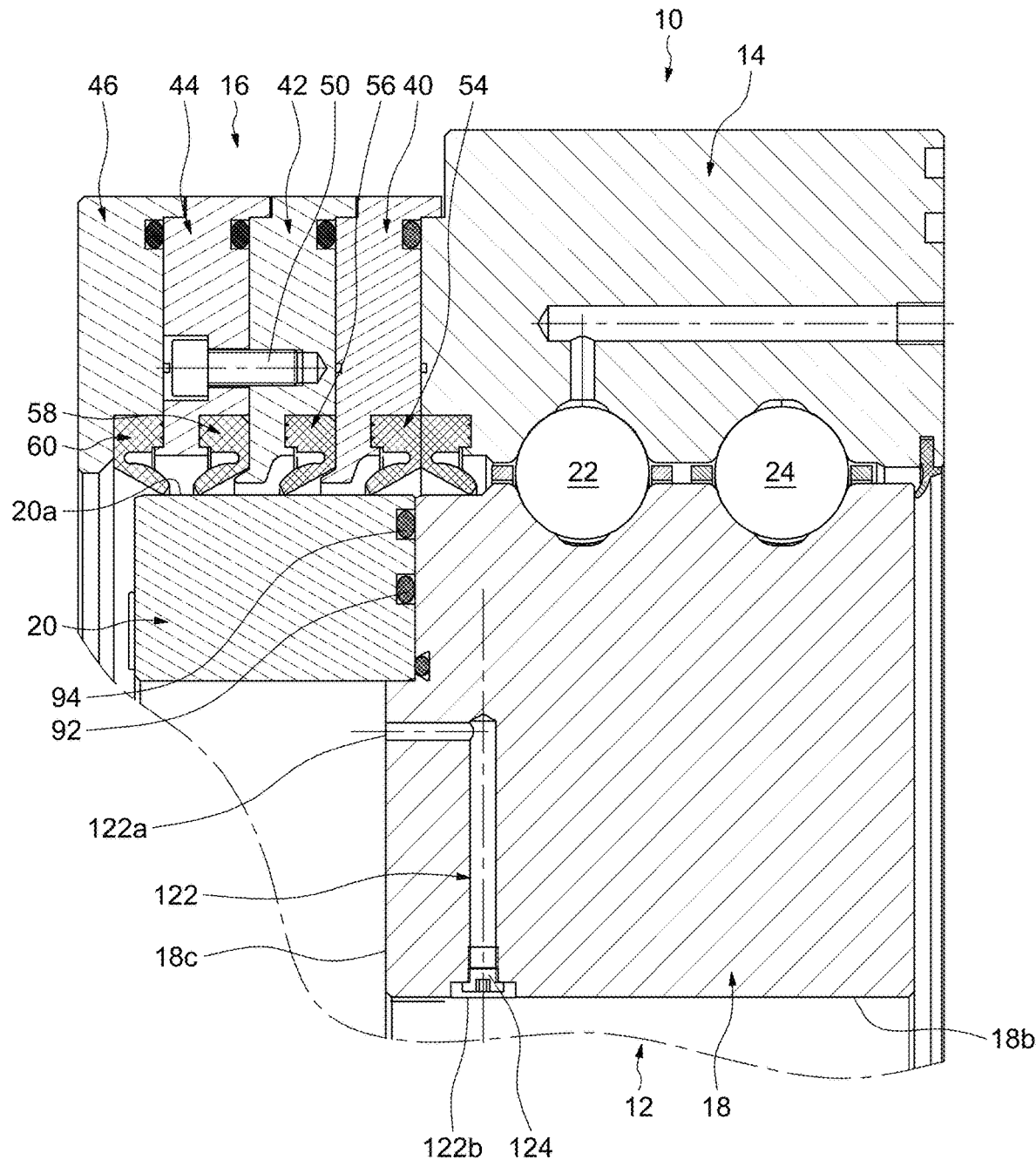

As shown on FIG. 7, in the illustrated example, the rolling-element bearing further comprises a third leakage test channel 122 in the rolling ring 18 of the inner ring.

The leakage test channel 122 has an inlet orifice 122a opening on the frontal surface 18c of the rolling ring in a zone offset radially inward with respect to the sealing ring 20. The leakage test channel 122 has an outlet orifice 122b opposite the inlet orifice 122a and opening on the bore 18b of the rolling ring. The leakage test channel 122 is formed from several holes or bores in the thickness of the rolling ring 18. The leakage test channel 122 comprises an axial first hole (not referenced) extending from the inlet orifice 122a and a radial second hole (not referenced) connected to the radial first hole and connected to the outlet orifice 122b, the holes being both formed in the thickness of the rolling ring 18.

The zone of the frontal surface 18c of the rolling ring onto which the inlet orifice 122a opens is intended to be in axial contact with a frame of an associated machine (not referenced) via two seals. The inlet orifice 122a is located radially between these two seals.

Prior to operation, the leakage test channel 112 enables a fluid to be introduced radially between these seals to test their effectiveness. The introduced fluid may be compressed air, lubricant, colored liquid, etc.

In operation, the leakage test channel 112 enables the evacuation of any fluid which leaks into the zone radially between these seals at the junction of the frontal surface 18c of the rolling ring and the frame of the associated machine.

The rolling-element bearing also comprises a fifth closing plug 124 attached at the outlet orifice 112b of the leakage test channel. The closing plug 124 may be attached to the outlet orifice 112b by any appropriate means, for example by screwing. Preferably, the closing plug 124 is made of transparent material in order to allow visual detection of the presence of contaminant fluid during an inspection. In the illustrated example, the closing plug 124 does not radially protrude with respect to the bore 18b of the rolling ring. The closing plug 124 may be covered by potting material and embedded inside this material.

Figure 9:
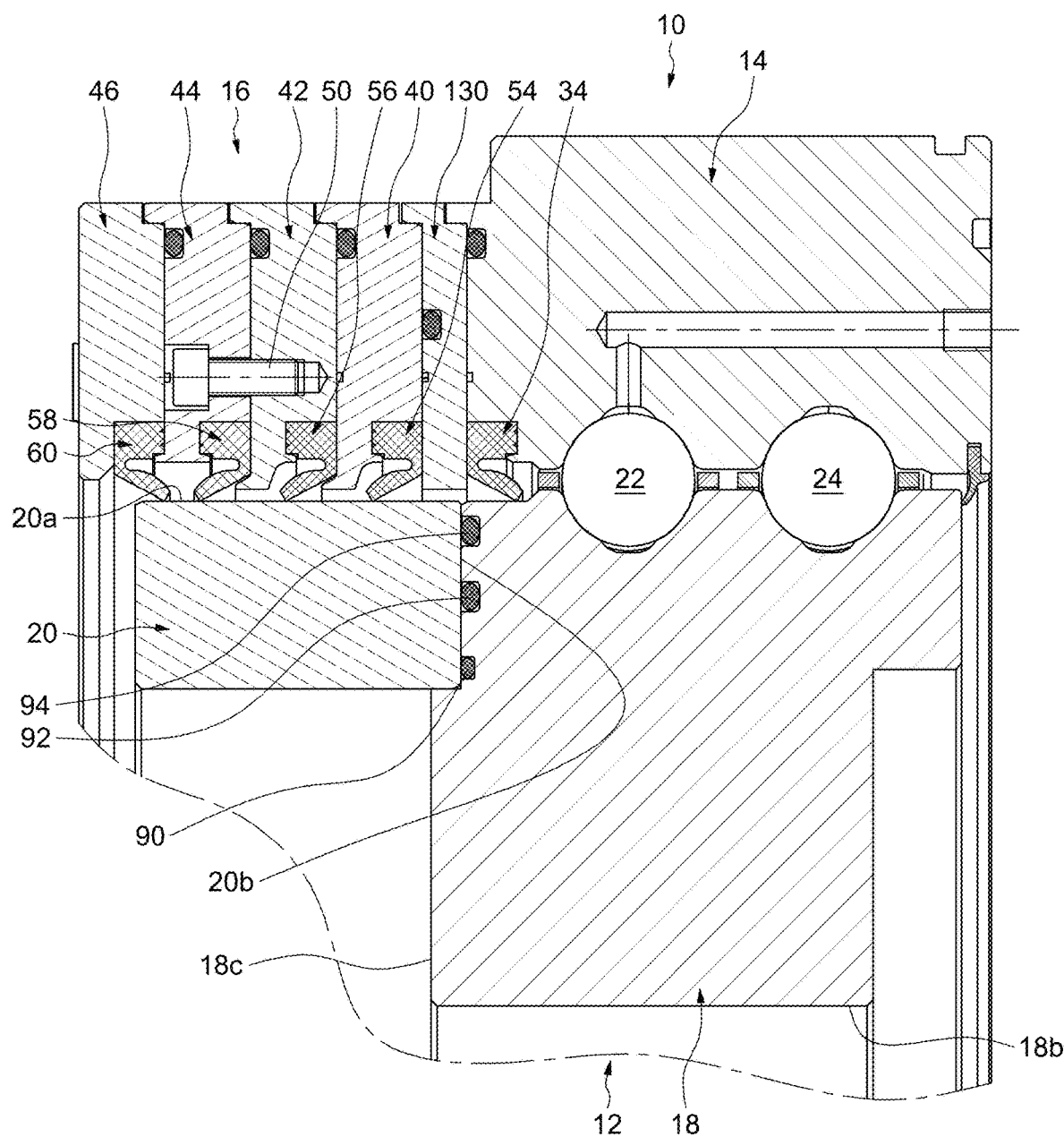
FIG. 9 is a cross-section of a rolling-element bearing according to a third example of the disclosure.

The example shown on FIG. 9, in which identical parts are given identical references, differs from the first embodiment in that the sealing ring 16 of the outer ring further includes a spacer 130 interposed axially between the rolling ring 14 and the first part ring 40. Here, the first seal 54 is axially spaced with respect the seal 34. In this example, the axial length of the sealing ring 20 of the inner ring is increased.

The spacer 130 allows the sealing lips of the seals 54, 56, 58, 60 to adopt two different axial positions, namely the first one with this spacer and the second one with the spacer removed and the axial contact of the first part 40 directly against the rolling ring 14. By removing the spacer 130, the seals 54, 56, 58, 60 are axially displaced along the outer surface 20a of the sealing ring of the inner ring.

Otherwise, as previously mentioned, in the illustrated examples, the first ring assembly of the rolling-element bearing is the outer ring whereas the second ring assembly is the inner ring. As an alternative, a reversed arrangement could be provided in which the first ring assembly forms the inner ring and the second ring assembly forms the outer ring.

In the described examples, the rolling-element bearing comprises two rows of rolling elements. Alternatively, the rolling-element bearing may comprise only one row of rolling elements, or three or more rows of rolling elements. In the illustrated example, the rolling elements are balls. The rolling-element bearing may comprise other types of rolling elements, for example rollers.

Representative, non-limiting examples of the present disclosure were described above in detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the disclosure in the broadest sense, and are instead taught merely to particularly describe representative examples of the disclosure. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing comprising:
a first ring assembly and a concentric second ring assembly mounted for rotation relative to the first ring assembly,
the first ring assembly comprising a first rolling ring having a raceway and a first sealing ring mounted axially to the first rolling ring at a first joint, the first sealing ring supporting a first seal element and a second seal element,
the second ring assembly comprising a second rolling ring having a raceway and a second sealing ring mounted axially to the second rolling ring at a second joint, and
a row of rolling elements between the raceway of the first rolling ring and the raceway of the second rolling ring,
wherein the second sealing ring includes a leakage test channel and a first sealing member radially spaced from a second sealing member and/or the first sealing ring including a leakage test channel and a sealing member radially spaced from the first seal element,
wherein the first seal element includes a first lip in contact with the second sealing ring and the second seal element includes a second lip in contact with the second sealing ring, and
wherein:
when the first sealing ring includes the leakage test channel of the first sealing ring, the leakage test channel of the first sealing ring has an inlet orifice between the sealing member of the first sealing ring and the first seal element and an outlet orifice at an external surface of the first ring assembly, and/or
when the second sealing ring includes the leakage test channel of the second sealing ring the leakage test channel of the second sealing ring has an inlet orifice between the first sealing member of the second sealing ring and the second sealing member of the second sealing ring and an outlet orifice at an external surface of the second ring assembly.

2. The rolling-element bearing according to claim 1,
wherein the second sealing ring includes the leakage test channel of the second sealing ring, and
wherein the external surface of the first ring assembly comprises an external surface of the first sealing ring and the external surface of the second ring assembly comprises an external surface of the second rolling ring.

3. The rolling-element bearing according to claim 2,
wherein:
the first sealing ring includes the leakage test channel of the first sealing ring, and
the second sealing ring includes the leakage test channel of the second sealing ring.

4. The rolling-element bearing according to claim 3,
wherein the second sealing ring includes the leakage test channel of the second sealing ring, and
wherein the external surface of the second ring assembly comprises an external surface of the second sealing ring.

5. The rolling-element bearing according to claim 3,
including a first transparent closing element removably attached at the outlet orifice of the leakage test channel of the first sealing ring and a second transparent closing element at the outlet orifice of the leakage test channel of the second sealing ring.

6. The rolling-element bearing according to claim 2,
wherein the first sealing ring comprise a first sealing ring section mounted axially against a second sealing ring section, and
wherein the first seal element is supported by the first sealing ring section and the second seal element is supported by the second sealing ring section.

7. The rolling-element bearing according to claim 6,
wherein the leakage test channel of the first sealing ring extends axially through the first sealing ring section and the second sealing ring section.

8. The rolling-element bearing according to claim 7,
including a third sealing ring section mounted axially against the second sealing ring section and a third seal element supported by the third sealing ring section, the third seal element having a third lip in contact with the second sealing ring, and
wherein the leakage test channel of the first sealing ring extends through the third sealing ring section.

9. The rolling-element bearing according to claim 1,
wherein the second sealing ring includes leakage test channel of the second sealing ring, and
wherein the external surface of the second ring assembly comprises an external surface of the second sealing ring.

* * * * *